UNITED STATES PATENT OFFICE.

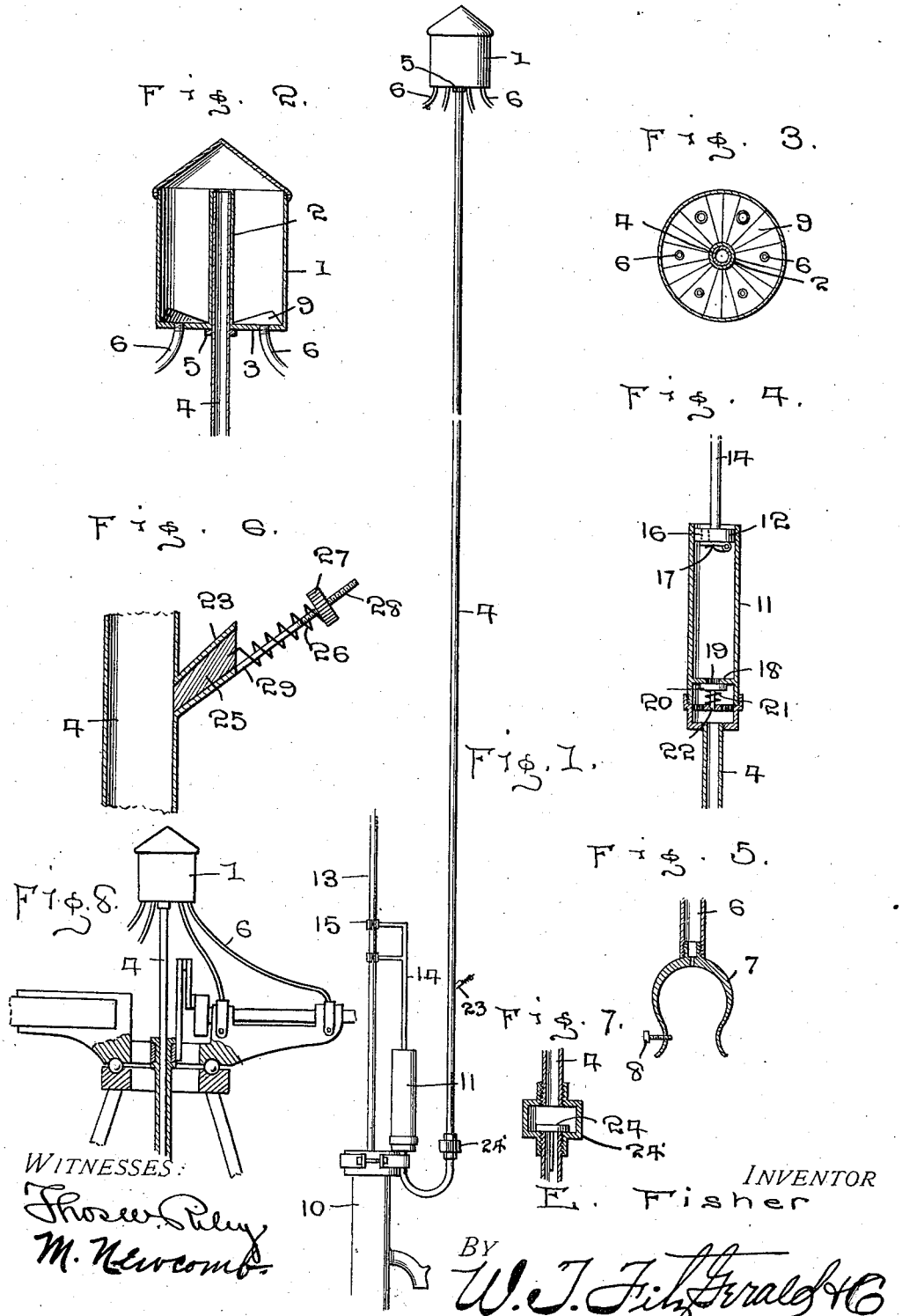

ERNEST FISHER, OF TWIN BROOKS, SOUTH DAKOTA.

LUBRICATING MECHANISM.

996,754. Specification of Letters Patent. Patented July 4, 1911.

Application filed May 25, 1910. Serial No. 563,322.

*To all whom it may concern:*

Be it known that I, ERNEST FISHER, a citizen of the United States, residing at Twin Brooks, in the county of Grant and State of South Dakota, have invented certain new and useful Improvements in Lubricating Mechanisms; and I do hereby declare the following to be a full, clear, and exact description of the invention, such as will enable others skilled in the art to which it appertains to make and use the same.

My invention relates to new and useful improvements in lubricating mechanisms and more particularly to that class adapted to be used for oiling the bearing parts of a wind-mill or motor and my object is to provide a reservoir and place the same at the top of the wind-mill and above the bearing parts thereof.

A further object is to provide feed pipes, whereby the lubricant may be conveyed to the bearing parts.

A further object is to provide means for attaching the feed pipes to the bearing parts.

A further object is to provide means whereby the lubricant may be entered into the reservoir from a point adjacent the lower portion of the wind-mill.

A further object is to provide means in conjunction with the parts operated by the wind-mill for elevating and discharging the lubricant into the reservoir by air pressure.

A further object is to provide suitable controlling valves in connection with the air pressure mechanism.

A further object is to provide means whereby the lubricant may be introduced into position to be elevated into the reservoir, and, a still further object is to provide means for normally closing the opening through which the lubricant is introduced.

Other objects and advantages will be hereinafter referred to and more particularly pointed out in the specification and claims.

In the accompanying drawings which are made a part of this application, Figure 1 is a detail elevation of a reservoir and parts employed for depositing the lubricant therein. Fig. 2 is an enlarged sectional view through the reservoir. Fig. 3 is a transverse sectional view thereof. Fig. 4 is a detail sectional view through the air pump employed for forcing the lubricant into the reservoir. Fig. 5 is a detail sectional view showing the means for attaching the feed pipes to parts of the machinery. Fig. 6 is a sectional view showing the port for introducing the lubricant in position to be moved into the reservoir and also showing the means for normally closing said port. Fig. 7 is a detail sectional view of a check valve employed in connection with the device, and Fig. 8 is a side elevation of the mill-head of a wind-mill, parts thereof being shown in section with my lubricating device in place thereon.

Referring to the drawings in which similar reference numerals designate corresponding parts throughout the several views, 1 indicates a reservoir, which may be constructed in any preferred manner, but preferably circular in cross section, said reservoir having a central socket 2, which extends from the bottom 3 of the reservoir to a point adjacent the upper end thereof.

Extending through the socket 2 is the upper end of a feed pipe 4, through which lubricant is introduced into the reservoir, said feed pipe having a collar 5 attached thereto, upon which the reservoir rests, said reservoir being rotatably mounted upon the upper end of the feed pipe with its axis of rotation coincident with that of the mill head, as will be clearly seen by reference to Fig. 8 of the drawing.

This device is primarily used in connection with wind-mills or similar devices and the object is to supply the lubricant to the bearing parts of the wind-mill without requiring the attendant to scale the wind-mill to place the lubricant on the bearing parts thereof. To this end, a plurality of tubes 6 project from the bottom of the reservoir and extend to the parts to be lubricated, the outer ends of the tubes being removably secured to the parts of the wind-mill by attaching to the outer ends of the tubes, forked clamps 7, which are adapted to straddle the parts of the wind-mill and are attached thereto by means of clamping screws 8.

The bottom of the reservoir is preferably provided with ribs or inclined portions 9, which tend to cause the lubricant to flow toward the feed tubes and it will be readily understood that the diameter of said tubes may be increased or decreased to supply a greater or less amount of the lubricant to the parts of the wind-mill.

The feed pipe 4 extends downwardly from the reservoir to a point adjacent the object operated by the wind-mill and for convenience of illustration, I have shown a pump 10, as being operated by the mill.

In order to elevate the lubricant through the feed pipe and discharge the same into the reservoir, the lower end of the feed pipe is connected to a cylinder 11, said cylinder having a piston 12 mounted therein, whereby air may be forced through the feed pipe and the lubricant elevated and discharged into the reservoir.

The piston 12 is connected to the pump rod 13 by means of a piston rod 14 and by providing suitable clamps 15, the piston rod may be readily engaged with the pump rod, so that the piston will be moved into and out of the cylinder 11 as the pump rod is operated.

The piston 12 has a port 16 therethrough, through which air may enter the cylinder when the piston is raised, a spring pressed valve 17 being hinged to the lower face of the piston and normally in position over said port.

The lower portion of the cylinder is provided with a partition 18, through which is formed an opening 19 and immediately below said opening and adapted to normally close the same is a valve 20, which is held in position over the opening 19 by means of a spring 21, said spring surrounding the stem 22 of the valve.

By arranging the valves 17 and 20, as shown, the valve 20 will be opened and the air in the cylinder forced into the feed pipe 4, when the piston descends, while the valve 20 will close the opening 19 and the valve 17 be moved from over the port 16, when the piston ascends, thereby admitting a fresh supply of air into the cylinder.

In placing the lubricant in the feed pipe 4, said feed pipe is provided with an inlet port, which is in the shape of a tapered nozzle 23, which nozzle is also at an angle above the horizontal, so that the lubricant when placed therein will readily descend and enter the feed pipe.

In order to prevent the lubricant from passing into the air compressing cylinder, a valve 24 in a valve casing 24' is placed in the feed pipe 4 and adjacent the lower end of said feed pipe, said valve being so arranged as to readily operate and permit the air to pass upwardly in its course through the feed pipe.

After the proper amount of lubricant has been introduced into the feed pipe, a stopper 25, preferably of cork, is introduced into the nozzle and normally held therein by means of a spring 26, one end of the spring being attached to the stopper, while the opposite end abuts against an adjusting nut 27, which nut is in turn engaged with the threaded portion 28 of a stem 29.

The stem is preferably formed integral with the nozzle and extends outwardly therefrom, the spring 26 being coiled around the stem so as to hold the spring in proper alinement to direct inward pressure against the stopper.

After the stopper has been properly positioned within the nozzle, the wind-mill is placed in operation and as the pump rod is moved upwardly and downwardly, the piston 12 will be operated and air forced into the pipe 4 below the lubricant, which will result in forcing the lubricant upwardly into the reservoir 1 and thence through the tubes 6 to the bearings.

As soon as the lubricant has reached the bearings, the pressure within the reservoir and feed pipe will be such as to force the stopper out of the nozzle, thus permitting the air to escape at this point until such time as the clamps 15 are released from the pump rod and the operation of the piston thus stopped.

If at any time the flow of the lubricant from the reservoir becomes sluggish or otherwise retarded, the piston may be again operated and the lubricant placed under a pressure, thus forcing the lubricant through the feed pipe. It will further be seen that by mounting the reservoir upon the end of the pipe, as shown, said reservoir may rotate with the wind-mill. It will likewise be seen that when the pressure in the feed pipe has reached a certain point, the stopper will be blown from the nozzle and the air permitted to escape at this point, thereby removing the pressure from the reservoir and it will likewise be seen that in view of the simplicity of the device, it can be very cheaply constructed and readily applied to use.

What I claim is:—

1. In a lubricating device for wind-mills, the combination with a rotatably mounted reservoir, feed pipes connected to the bottom of said reservoir and leading to various bearing parts, of a supply pipe depending from said reservoir, an air pump connected to the lower end of the supply pipe, a nozzle communicating with said supply pipe, a valve between said nozzle and air pump and pressure regulated means adapted to normally close said nozzle.

2. In a lubricating device, the combination with a reservoir, tubes connected thereto, a supply pipe connected to the reservoir and an air pump connected to the lower end of the supply pipe, of a nozzle communicating with said supply pipe, a stopper for said nozzle, a spring adapted to direct pressure against said stopper and means to increase or decrease the pressure of said spring against the stopper.

3. In a lubricating device, the combination with a supply pipe having a nozzle, through which a lubricant may be introduced into said pipe and means to direct air pressure through said pipe, of a stopper for said nozzle, a spring adapted to direct inward pressure on said stopper and means to increase or decrease the tension of said spring.

4. In a lubricating device for wind-mills, the combination with a rotatable reservoir, a supply pipe therefor, tubes leading from said reservoir to various bearing parts, and means whereby a lubricant may be entered in said supply pipe; of an air pump connected to said supply pipe and adapted to force the lubricant upwardly to said reservoir, said pump being automatically operated by the operation of the wind-mill, and means to prevent the lubricant from entering the pump.

In testimony whereof I have signed my name to this specification in the presence of two subscribing witnesses.

ERNEST FISHER.

Witnesses:
ENOCH LINDQUIST,
G. W. EGSMAYER.

Copies of this patent may be obtained for five cents each, by addressing the "Commissioner of Patents, Washington, D. C."